United States Patent Office 3,299,800
Patented Jan. 24, 1967

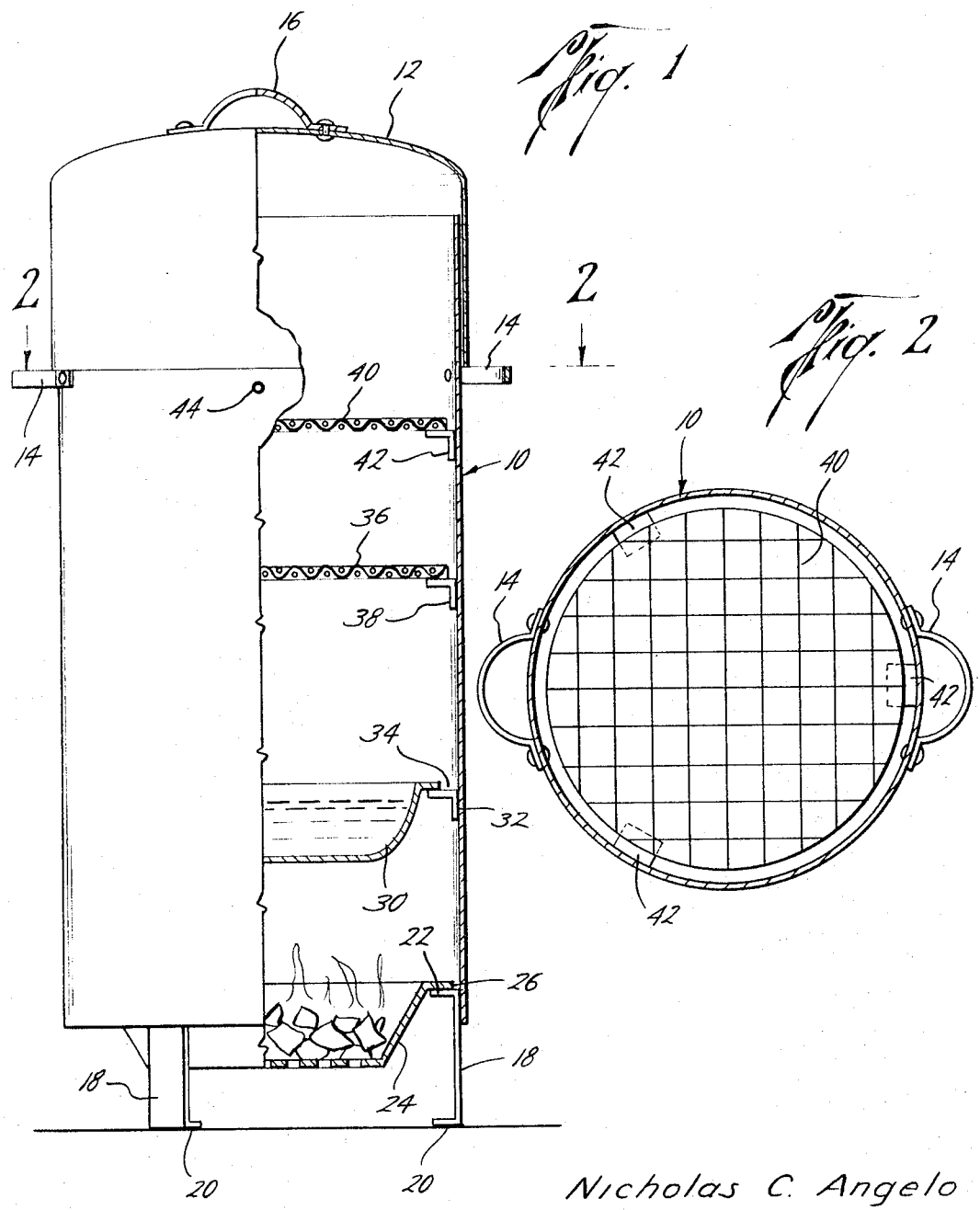

3,299,800
BROILING AND ROASTING APPARATUS
Nicholas C. Angelo, 585 Castleton Ave.,
Staten Island, N.Y. 10301
Continuation of application Ser. No. 213,201, July 30,
1962. This application Mar. 22, 1965, Ser. No. 454,229
3 Claims. (Cl. 99—417)
(Filed under Rule 47(b) and 35 U. S. C. 118)

This is a continuation application of copending application Serial No. 213,201, filed July 30, 1962, now abandoned, by the same inventor.

This invention relates to cooking apparatus and more particularly to apparatus which may be used for the cooking of meats and other foods in a number of different ways.

The invention is capable of use in a number of different ways for the cooking of food, such as by broiling or baking the same in the usual manner over hot coals, commonly referred to as barbecuing, and finds particular utility in connection with the cooking of meat by subjecting the same to a steaming process followed by continued baking or broiling without the use of additional moisture and with or without smoking.

The invention has for an important object the provision of cooking apparatus embodying means for supporting food, such as meat, in an enclosed spaced above hot coals, and including means for subjecting the food to a preliminary cooking in a moist atmosphere and for thereafter subjecting the same to roasting or broiling under relatively dry atmospheric conditions.

Another object of the invention is the provision of cooking apparatus in which food may be slowly cooked for an extended period of time without attention and without danger of burning the food.

A further object of the invention is to provide cooking apparatus comprising a hollow, cylindrical body open at its lower end and whose upper end is closed by a removable cover, a fire pan supported at a lower level in the body, a water pan supported in the body above the fire pan and means in the body above the water pan for supporting food in the body in position to be exposed to the heat and moisture from the fire pan and water pan.

Another object of the invention is the provision of food cooking apparatus of the kind referred to in which the fire pan, water pan and food supporting means are removable to allow the apparatus to be used for the cooking of food by the exposure of the same to moist heat or by the use of dry heat.

A still further object of the invention is to provide cooking apparatus of the kind referred to which has a simple design and rugged construction and which may be economically manufactured.

Yet another object of the invention is to provide cooking apparatus of the kind referred to which prevents the flame from the fire from flaring up from drippings from cooking foods thereby contaminating them.

The above and other important objects and advantages of the invention may best be understood from the following detailed description, constituting a specification of the same, reference being had to the accompanying drawings, wherein:

FIGURE 1 is a side elevational view, partly broken away and partly in cross-section illustrating a preferred embodiment of the cooking apparatus of the invention; and FIGURE 2 is a cross-sectional view, taken along the line 2—2 of FIGURE 1, looking in the direction indicated by the arrows.

Referring now to the drawings in greater detail the invention is illustrated herein in connection with its application to the cooking of food by a process of heating the food in an atmosphere containing large amounts of moisture or vapor, by which the food is subjected to a preliminary cooking, and subsequently further cooking the food in a dry atmosphere to broil or roast the same.

The cooking apparatus comprises a hollow body 10, preferably of cylindrical shape, formed of metal, whose lower end is open and whose upper end is closed by a removable cover 12. The body is provided with external handles 14 which are positioned somewhat below the upper end of the body at diametrically opposite locations, and upon which the cover 12 may rest when the cover is in position on the body. The cover 12 has a central handle 16 for lifting the same.

The body 10 is provided at its lower end with legs 18, which are preferably of channel shape in cross-section and which are secured to the inner face of the body in any suitable manner, as by means of welding, with the web of the channel positioned vertically and the flanges thereof extending radially inwardly, so that the lower flanges 20 serve as feet upon which the obdy may stand upright, while the upper flanges 22 serve as internal supports for a fire pan 24 removably disposed within the lower end of the body. The fire pan 24 is of somewhat smaller diameter than the internal diameter of the body to provide an open space 26 surrounding the pan through which air may enter the lower end of the body. The pan 24 is provided with bottom openings 28 through which air may flow to maintain the fire in the pan.

Above the fire pan 24 an open receptacle 30 is removably supported on angle brackets 32 suitably secured to the body, within which receptacle a supply of water is held in position to be heated by the fire to cause the water to boil whereby steam is produced to maintain the atmosphere in the body in a highly moist condition. The receptacle 30 is also of somewhat smaller diameter than the internal diameter of the body to provide an annular space 34 through which air may pass upwardly about the receptacle.

A lower grid 36 is supported in the body above the water receptacle 30 on angle brackets 38 similar to the brackets 32 which are similarly secured to the body. The grid 36 is preferably of heavy metallic mesh construction to support food, such as meat in a position to be steamed and roasted.

The body may also be provided with an upper grid 40 located above the grid 36 and similarly supported on angle brackets 42, which grid is of the same construction as the lower grid 36 for supporting additional food to be cooked. The grids 36 and 40 are preferably of circular shape and of somewhat smaller diameter than the internal diameter of the body, so that the grids may be easily removed through the upper end of the body by tilting the grids so that they do not catch on the brackets while being lifted out of the body.

The body has one or more small side openings, such as that shown at 44, located just below the lower edge of the cover 12 through which air and smoke may gradually escape from within the body during the cooking of the food.

The cooking apparatus of the invention, constructed as described above may be used in several different ways for the broiling and roasting of foods, depending upon the nature of the food which is to be cooked and the manner in which the cooking is to be carried out.

In the broiling and roasting of meats, the apparatus may be assembled as shown in the drawings, the meat being placed on one or both of the grids, the receptacle 30 being provided with water and the fire pan being loaded with suitable fuel, such as charcoal. With the apparatus thus loaded and the fire burning briskly, the cover 12 is placed on the body to retain the heat and moisture during the preliminary cooking of the meat. During the cooking of the meat, the water in the receptacle will be boiled to fill the body with steam or very moist heat until the water has been entirely boiled away. By thus preliminarily cooking the meat the meat will be kept in a tender and juicy condition and prevented from being burnt or charred by the relatively intense heat of the fire. The duration of this preliminary moist cooking operation may, of course, be readily regulated by the amount of water placed in the receptacle 30 as well as by the amount of fuel provided.

After the water has been evaporated from the receptacle 30, it will be apparent that the fire will by such time have subsided, so that the heat will not be so intense and the danger of burning the meat will have passed. When the preliminary cooking has thus been accomplished, the meat may be left in the apparatus to be further broiled and roasted by the fire, the atmosphere within the body becoming less moist as the moisture escapes with the heat through the opening 44, to allow the meat to be thoroughly cooked and browned to any desired extent.

By regulating the amount of fuel and water at the commencement of the cooking operation it will be readily apparent that the duration of the preliminary cooking of the meat in a moisture laden atmosphere as well as the subsequent roasting and browning of the same, can be accurately predetermined as may be desired. Moreover, by the use of the apparatus of the invention the cooking of the meat may be carried out slowly over an extended period of time, so that the cooking operation may be left unattended and the meat will be retained in condition for use for a long time even after the fire has completely died out.

Any juices or fat which may drip from the meat during the roasting of the same will be retained in receptacle 30 for use in any desired way, such as for the making of gravy. By supplying the fire with chips or pieces of wood, the meat may be smoked to any desired degree during the cooking.

The apparatus effectively isolates the meat from the charcoal fuel in the fire pan 24 by the receptacle 30 to prevent flame from flaring up from drippings from the meat onto the charcoal and directly licking against the meat. This isolation is believed to be very beneficial in preventing contamination of the meat with products harmful for human consumption.

The apparatus of the invention may also be used for the broiling of meat or other food in the same way as with the use of an open fire or barbecue pit, by removing the grid 36 and supporting the fire pan 24 on the brackets 38 with the grid 40 in place and the cover 12 removed.

The apparatus may, of course, be utilized with equally satisfactory results for the cooking of any kind of food which is to be roasted, broiled or baked and which it is desired to first subject to heating in a moisture laden atmosphere preliminary to cooking by dry heat.

It will thus be seen that the invention, constructed and used in the manner described above, provides cooking apparatus of simple design, which may be used in a number of different ways, which is easily cleaned and maintained in a sanitary condition and by which the cooking of food may be carried out with a minimum of preparation and attention.

The invention is disclosed herein in connection with a particular embodiment of the apparatus, but it will be understood that this is intended by way of example only and that various changes can be made in the construction and arrangement of the parts within the spirit of the invention and the scope of the appended claims.

Having thus clearly shown and described the invention, what is claimed as new and desired to secure by Letters Patent is:

1. A cooking apparatus for precooking food items under moist-atmospheric conditions and final cooking under dry-atmospheric conditions, comprising
    a cylindrically shaped body of substantially uniform internal dimension along its elongated axis,
    legs of channel shape in cross-section positioned within and extending downwardly from the lower end of the body and attached to the wall of the body with the flanges of the channels extending radially inwardly of the body, to support the body in an upright position with the lower end of the body spaced above the ground,
    at least two vertically spaced sets of angle-shaped support elements in the body above the legs the elements of each set being peripherally spaced with flanges thereof extending radially inwardly of the body in a common horizontal plane,
    a fuel support adapted to be removably disposed in the body on any of the upper flanges of the legs and the angle-shaped support elements in inwardly spaced relation to the internal surface of the body to provide space between the body and fuel support through which air may flow upwardly into the body,
    a receptacle for water adapted to be removably disposed in the body on the inwardly extending flanges of any of the angle-shaped support elements above the fuel support in inwardly spaced relation to the internal surface of the body to provide space between the receptacle and body through which air may flow upwardly in the body about the receptacle,
    a grid adapted to be removably disposed in the body on the inwardly extending flanges of any of the angle-shaped support elements not supporting the fuel support and the receptacle, and
    said receptacle effectively isolating the fuel support from said grid thereby preventing flames from flaming up against said grid,
    a cover removably positioned over the upper end of the body to close the same,
    said body having an opening through which air may flow out of the body when the upper end is closed,
    said receptacle being removable when the food items have been precooked under moist-atmospheric conditions to allow the receptacle to be removed and to allow the grid and the fuel support to be repositioned on any of the flanges of the legs and angle-shaped support elements for final cooking under dry-atmospheric conditions.

2. A cooking apparatus in accordance with claim 1, wherein
    said fuel support, said receptable, and said grid can be tilted for removal and repositioning through the upper end of the body when the cover is removed.

3. A cooking apparatus in accordance with claim 1, wherein
    the receptacle captures the juices from the cooking food items for making a base for gravy.

References Cited by the Examiner
UNITED STATES PATENTS

| 2,004,024 | 6/1935 | Van Voorst | 99—259 X |
| 3,087,414 | 4/1963 | Gannon | 99—259 |

FOREIGN PATENTS

| 175,566 | 2/1922 | Great Britain. |

WALTER A. SCHEEL, *Primary Examiner.*

S. FISHER, *Assistant Examiner.*